US010642281B2

(12) United States Patent
Maruo et al.

(10) Patent No.: US 10,642,281 B2
(45) Date of Patent: May 5, 2020

(54) SERVICE PROVIDING SYSTEM AND REQUEST RECEIVING ROBOT

(71) Applicant: FUJI XEROX CO., LTD., Tokyo (JP)

(72) Inventors: Masatoshi Maruo, Kanagawa (JP); Hideki Fujimoto, Kanagawa (JP); Mariko Miyazaki, Kanagawa (JP); Hajime Kajiyama, Kanagawa (JP); Akira Ichikawa, Kanagawa (JP); Naoya Ogata, Kanagawa (JP); Tetsuya Kobayashi, Kanagawa (JP); Toshihiko Shibusawa, Kanagawa (JP); Kunitoshi Yamamoto, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 229 days.

(21) Appl. No.: 15/784,493

(22) Filed: Oct. 16, 2017

(65) Prior Publication Data
US 2018/0259973 A1    Sep. 13, 2018

(30) Foreign Application Priority Data

Mar. 8, 2017  (JP) ................................. 2017-043791

(51) Int. Cl.
| | |
|---|---|
| *G06Q 10/06* | (2012.01) |
| *G05D 1/02* | (2020.01) |
| *G05D 1/04* | (2006.01) |
| *G05D 1/00* | (2006.01) |
| *B64C 39/02* | (2006.01) |

(Continued)

(52) U.S. Cl.
CPC ......... *G05D 1/0276* (2013.01); *B64C 39/024* (2013.01); *G05D 1/0011* (2013.01); *G05D 1/0282* (2013.01); *G05D 1/042* (2013.01);

*G05D 1/102* (2013.01); *G06Q 30/00* (2013.01); *G06Q 50/12* (2013.01); *B64C 2201/022* (2013.01); *B64C 2201/101* (2013.01); *B64C 2201/122* (2013.01); *B64C 2201/127* (2013.01); *G05D 2201/0211* (2013.01); *Y10S 901/01* (2013.01)

(58) Field of Classification Search
CPC ........ B64C 2201/022; B64C 2201/122; G05D 1/0276; G05D 1/0282; Y10S 901/01
USPC ............ 700/257, 245; 726/2, 4, 26; 713/168
See application file for complete search history.

(56) References Cited

U.S. PATENT DOCUMENTS 9,492,922 B1 *   11/2016  Johnson ................ H02J 7/0003
2002/0177925 A1 * 11/2002  Onishi .................. B25J 9/1679
                                                            700/245

(Continued)

FOREIGN PATENT DOCUMENTS

JP         2008-46956 A      2/2008

*Primary Examiner* — Dalena Tran
(74) *Attorney, Agent, or Firm* — Oliff PLC

(57) ABSTRACT

A service providing system includes a request receiving robot and a service providing robot. The request receiving robot includes a floating unit configured to float in air, a recognition unit configured to recognize a service providing request by a user, and a transmitter configured to transmit the recognized service providing request. The service providing robot includes a receiver configured to receive the service providing request transmitted by the request receiving robot, a moving unit configured to move the service providing robot to the user who makes the service providing request as a destination according to the received service providing request, and a service providing unit configured to provide a service to the user.

9 Claims, 18 Drawing Sheets

(51) Int. Cl.
*G06Q 30/00* (2012.01)
*G06Q 50/12* (2012.01)
*G05D 1/10* (2006.01)

(56) References Cited

U.S. PATENT DOCUMENTS

2010/0131103 A1* 5/2010 Herzog ................... B25J 5/00
700/259
2017/0050321 A1* 2/2017 Look .............. G06Q 10/063118

\* cited by examiner

FIG.9

| ELAPSED TIME | ROBOT POSITION X | ROBOT POSITION Y |
|---|---|---|
| 0 | 0 | 0 |
| 1 | 1 | 0 |
| 2 | 2 | 0 |
| 3 | 3 | 0 |
| 4 | 4 | 0 |
| 15 | 2 | 5 |
| 16 | 1 | 5 |
| 17 | 0 | 5 |
| 18 | 0 | 4 |
| 19 | 0 | 3 |
| 20 | 0 | 2 |
| 21 | 0 | 1 |
| 22 | 0 | 0 |

| ELAPSED TIME | USER A | USER B | USER C | USER D | USER E | USER F |
|---|---|---|---|---|---|---|
| 0 | ○ | × | × | × | × | × |
| 1 | ○ | × | × | × | × | × |
| 2 | ○ | × | × | × | × | × |
| 3 | × | ○ | × | × | × | × |
| 4 | × | ○ | ○ | × | × | × |
| 5 | × | ○ | ○ | × | × | × |
| 15 | × | × | × | ○ | ○ | × |
| 16 | × | × | × | ○ | ○ | × |
| 17 | × | × | × | ○ | × | × |
| 18 | × | × | × | ○ | × | × |
| 19 | × | × | × | ○ | × | × |
| 20 | ○ | × | × | × | × | × |
| 21 | ○ | × | × | × | × | × |
| 22 | ○ | × | × | × | × | × |

FIG.11

| ELAPSED TIME | USER A | USER B | USER C | USER D | USER E | USER F |
|---|---|---|---|---|---|---|
| 0 | 0 | 101 | 101 | 101 | 101 | 101 |
| 1 | 0 | 102 | 102 | 102 | 102 | 102 |
| 2 | 0 | 103 | 103 | 103 | 103 | 103 |
| 3 | 1 | 0 | 104 | 104 | 104 | 104 |
| 4 | 2 | 0 | 0 | 105 | 105 | 105 |
| 5 | 3 | 0 | 0 | 106 | 106 | 106 |
| ~ | ~ | ~ | ~ | ~ | ~ | ~ |
| 15 | 13 | 10 | 7 | 0 | 0 | 2 |
| 16 | 14 | 11 | 8 | 0 | 0 | 3 |
| 17 | 15 | 12 | 9 | 0 | 1 | 4 |
| 18 | 16 | 13 | 10 | 0 | 2 | 5 |
| 19 | 17 | 14 | 11 | 0 | 3 | 6 |
| 20 | 0 | 15 | 12 | 1 | 4 | 7 |
| 21 | 0 | 16 | 13 | 2 | 5 | 8 |
| 22 | 0 | 17 | 14 | 3 | 6 | 9 |

1100

| ELAPSED TIME | AREA 100-1 | AREA 100-2 | AREA 100-3 | AREA 100-4 |
|---|---|---|---|---|
| 0 | 0 | 202 | 202 | 101 |
| 1 | 0 | 204 | 204 | 102 |
| 2 | 0 | 206 | 206 | 103 |
| 3 | 1 | 104 | 208 | 104 |
| 4 | 2 | 0 | 210 | 105 |
| 5 | 3 | 0 | 212 | 106 |
| 15 | 13 | 17 | 0 | 2 |
| 16 | 14 | 19 | 0 | 3 |
| 17 | 15 | 21 | 1 | 4 |
| 18 | 16 | 23 | 2 | 5 |
| 19 | 17 | 25 | 3 | 6 |
| 20 | 0 | 27 | 5 | 7 |
| 21 | 0 | 29 | 7 | 8 |
| 22 | 0 | 31 | 9 | 9 |

FIG.13

| ELAPSED TIME | AREA 100-1 | AREA 100-2 | AREA 100-3 | AREA 100-4 |
|---|---|---|---|---|
| 0 | 4 | 1 | 1 | 3 |
| 1 | 4 | 1 | 1 | 3 |
| 2 | 4 | 1 | 1 | 3 |
| 3 | 4 | 2 | 1 | 2 |
| 4 | 3 | 4 | 1 | 2 |
| 5 | 3 | 4 | 1 | 2 |
| 15 | 2 | 1 | 4 | 3 |
| 16 | 2 | 1 | 4 | 3 |
| 17 | 2 | 1 | 4 | 3 |
| 18 | 2 | 1 | 4 | 3 |
| 19 | 2 | 1 | 4 | 3 |
| 20 | 4 | 1 | 3 | 2 |
| 21 | 4 | 1 | 3 | 2 |
| 22 | 4 | 1 | 2 | 2 |

1300

SERVICE PROVIDING SYSTEM AND REQUEST RECEIVING ROBOT

CROSS-REFERENCE TO RELATED APPLICATIONS

This application is based on and claims priority under 35 USC 119 from Japanese Patent Application No. 2017-043791 filed Mar. 8, 2017.

BACKGROUND

TECHNICAL FIELD

The present invention relates to a service providing system and a request receiving robot.

SUMMARY

According to an aspect of the invention, a service providing system includes a request receiving robot and a service providing robot. The request receiving robot includes
a floating unit configured to float in air, a recognition unit configured to recognize a service providing request by a user, and a transmitter configured to transmit the recognized service providing request. The service providing robot includes a receiver configured to receive the service providing request transmitted by the request receiving robot, a moving unit configured to move the service providing robot to the user who makes the service providing request as a destination according to the received service providing request, and a service providing unit configured to provide a service to the user.

BRIEF DESCRIPTION OF THE DRAWINGS

Exemplary embodiments of the present invention will be described in detail based on the following figures, wherein:

FIG. 9 is a diagram illustrating an example of a service providing robot schedule;

FIG. 10 is a diagram illustrating an example of a contact availability table prepared by the service providing robot;

FIG. 11 is a diagram illustrating an example of a contact request intensity table prepared by the service providing robot;

FIG. 13 is a diagram illustrating an example of a robot schedule evaluation table prepared by the service providing robot;

DETAILED DESCRIPTION

Figure 1:
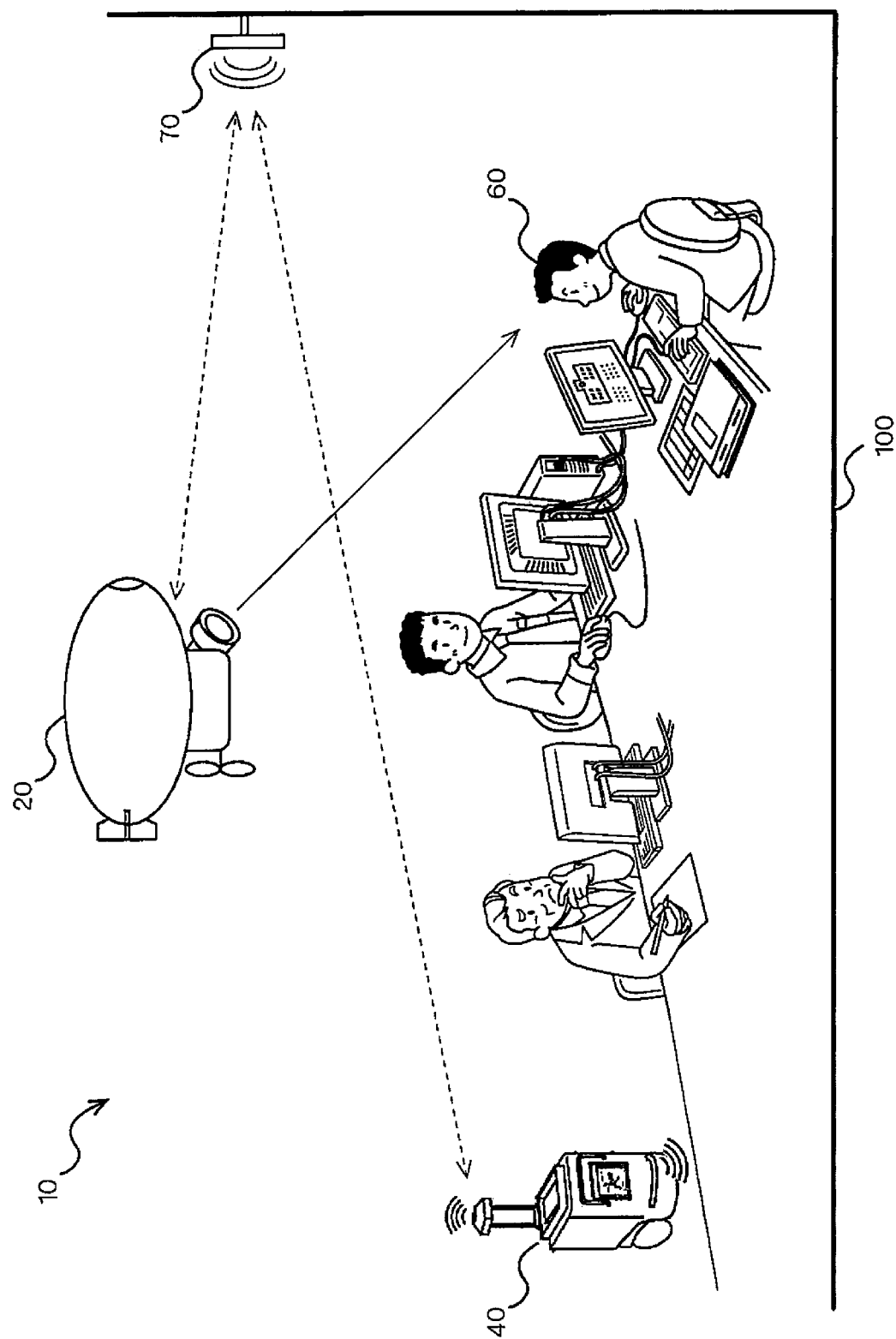
FIG. 1 is a diagram illustrating one example of a service providing system according to an exemplary embodiment of the present invention.

A service providing system 10 according to an exemplary embodiment of the present invention will be described with reference to FIG. 1. The service providing system 10 according to the exemplary embodiment includes a request receiving robot 20, a service providing robot 40, and an access point 70 which are disposed in a comparatively large predetermined region (hereinafter, referred to as a "workplace") 100 such as a floor of an office building. The access point 70 connects the request receiving robot 20 and the service providing robot 40 through a network in a wireless manner or the like. Further, it is assumed that plural users 60 exist in the workplace 100 and perform his/her tasks and that the request receiving robot 20 and the service providing robot 40 operate within the workplace 100.

Figure 2:
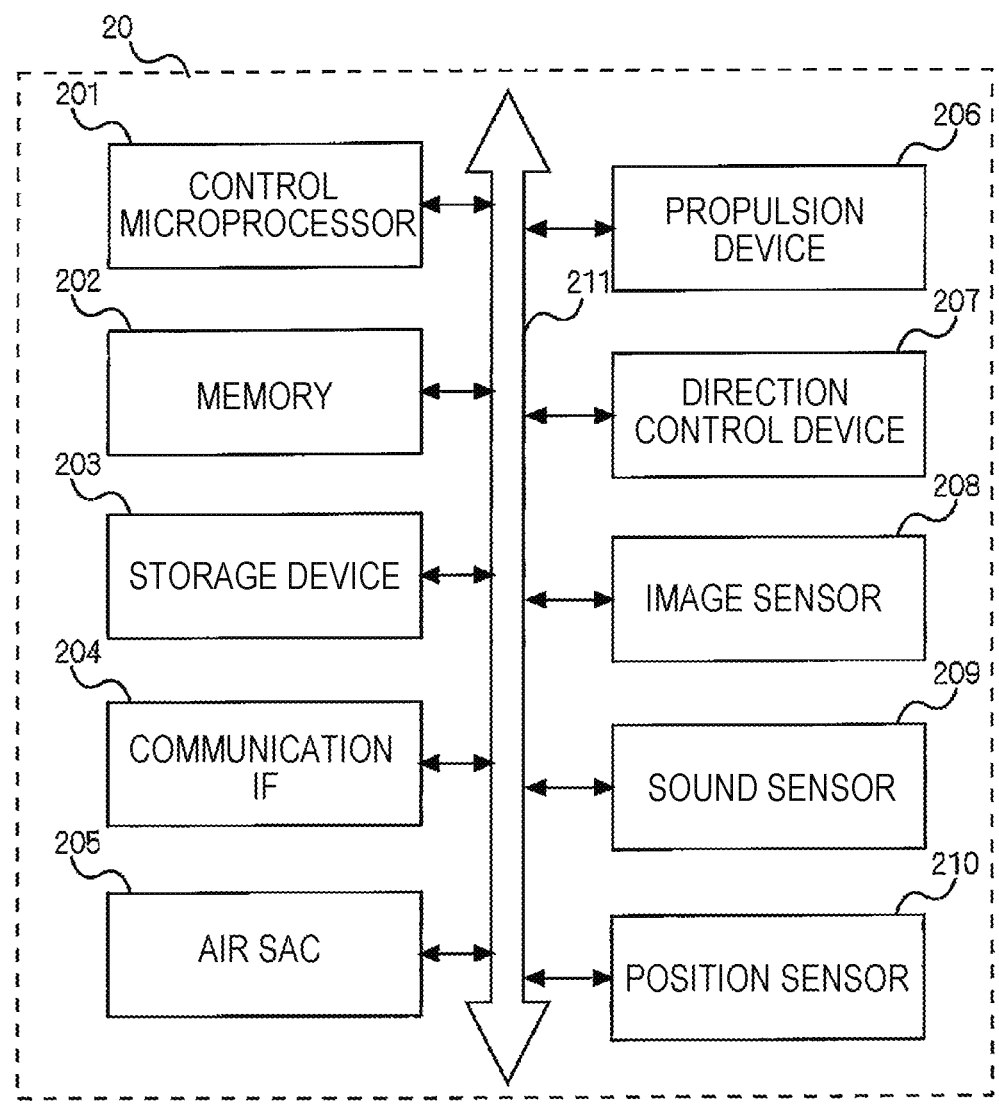
FIG. 2 is a hardware configuration diagram of a request receiving robot according to the exemplary embodiment.

Next, the request receiving robot 20 will be described with reference to FIGS. 2 and 3. FIG. 2 is a hardware configuration diagram of a request receiving robot 20. The request receiving robot 20 moves while floating in the workplace 100 and receives a service providing request from the user 60 in the workplace 100. As illustrated in FIG. 2, the request receiving robot 20 includes a control microprocessor 201, a memory 202, a storage device 203 such as a hard disk drive (HDD) and a solid state drive (SSD), a communication interface 204, an air sac 205, a propulsion device 206, a direction control device 207, an image sensor 208, a sound sensor 209, and a position sensor 210. Each of the components is connected to a control bus 211.

The control microprocessor 201 generally controls the operations of the respective units of the request receiving robot 20 based on a control program stored in the storage device 203. The memory 202 temporarily stores an image captured by the image sensor 208 of the request receiving robot 20, sound data detected by the sound sensor 209, information on a current position detected by the position sensor 210, information on the service providing request from the user 60, and the like. The storage device 203 stores the control program for controlling each unit of the request receiving robot 20. The communication interface 204 performs a communication control for the request receiving robot 20 to communicate with the service providing robot 40 through the access point 70.

The air sac 205 is an example of a floating unit that causes the request receiving robot 20 to float in the workplace 100. The air sac 205 is configured with a so-called gas bag. The air sac 205 is filled with a gas, such as helium gas, that has a specific gravity smaller than that of air. The propulsion device 206 includes a propeller and a motor. The direction control device 207 includes a rudder.

The image sensor 208 is configured with, for example, a camera attached to a lower side of the air sac 205. The image sensor 208 captures the inside of the workplace 100, in particular, the users 60. The captured image is temporarily stored in the memory 202. The sound sensor 209 is configured with a microphone. The sound sensor 209 detects voice uttered by the user 60. The sound sensor 209 temporarily stores the detected sound data in the memory 202. The position sensor 210 is configured with a GPS receiving device or the like. The position sensor 210 specifies the current position by receiving and analyzing signals from the GPS satellites. The specified position information is stored in the memory 202. Alternatively, the position sensor 210 may be configured with a receiving device that receives signals from beacon transmitters installed at respective locations within the workplace 100. The current position in the workplace 100 may be specified by analyzing the intensities of received beacon signals.

Figure 3:
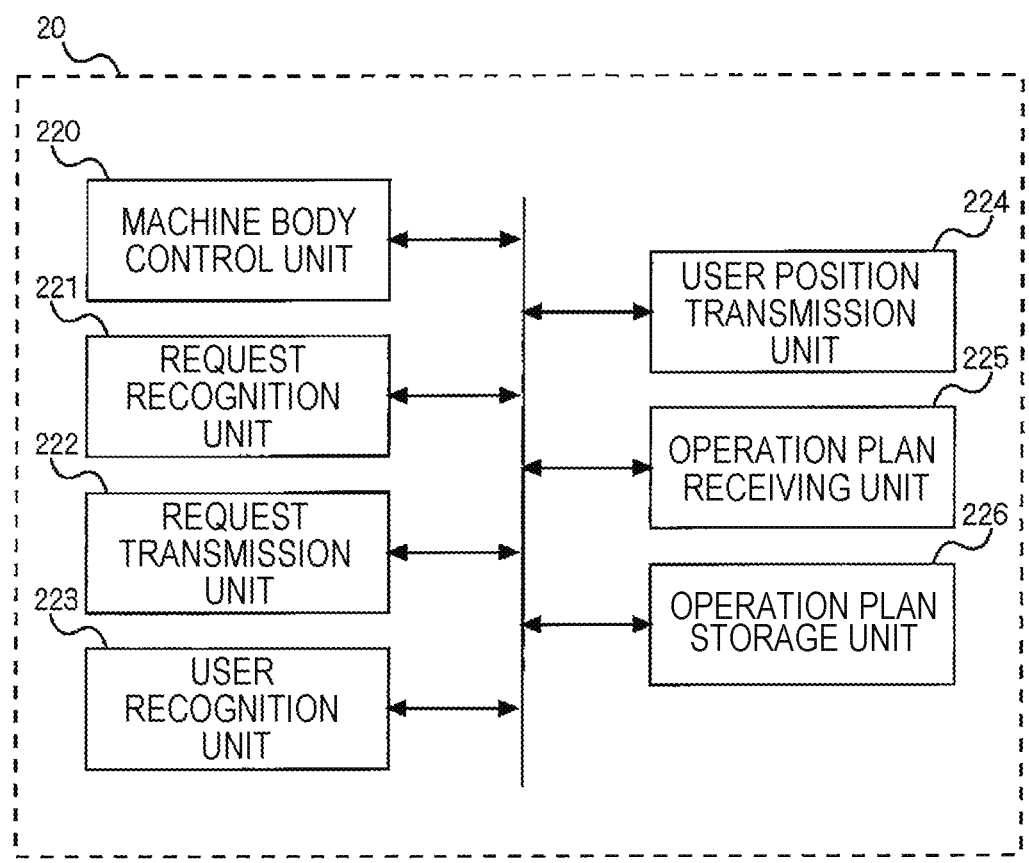
FIG. 3 is a functional block diagram of the request receiving robot according to the exemplary embodiment.

FIG. 3 is a functional block diagram of the request receiving robot 20. The request receiving robot 20 serves as a machine body control unit 220, a request recognition unit 221, a request transmission unit 222, a user recognition unit 223, a user position transmission unit 224, an operation plan receiving unit 225, and an operation plan storage unit 226 as illustrated in FIG. 3 by executing the control programs stored in the storage device 203 in the control microprocessor 201.

The machine body control unit 220 controls the propulsion device 206 and the direction control device 207 such that the request receiving robot 20 floats in the workplace 100 and moves in accordance with an operation plan corresponding to a user's position which will be described later.

When a user 60 makes a service providing request by a gesture or voice, the request recognition unit 221 recognizes the service providing request made by the user, specifies the contents of the requested service and the user 60 who has made the service providing request, and temporarily stores the specified contents in the memory 202 together with positional information of the user 60 who has made the service providing request.

The request transmission unit 222 transmits the service providing request recognized by the request recognition unit 221. Specifically, the request transmission unit 222 transmits (i) the information, specified by the request recognition unit 221, on the service providing request, that is, the contents of the requested service, (ii) the information on the user 60 who has made the service providing request and (iii) the position information of the user 60 to the service providing robot 40 via the access point 70.

Even if no user 60 makes a service providing request, the user recognition unit 223 continuously specifies who a user 60 around the request receiving robot 20 is and the position of the user 60. The user position transmission unit 224 to be described below transmits information as to who the surrounding user 60 is and the position information of the user 60 to the service providing robot 40.

The user position transmission unit 224 periodically transmits (i) the information on the user 60 who is in the vicinity of a movement route of the request receiving robot 20 and who is specified by the user recognition unit 223 during a period in which the request receiving robot 20 moves according to a predetermined operation plan and (ii) position information of the user 60, to the service providing robot 40 by the access point 70.

The operation plan receiving unit 225 receives an operation plan (to be described below) transmitted from the service providing robot 40. The operation plan is prepared according to the position of the user. The operation plan includes route information indicating a route along which the request receiving robot 20 moves in the workplace 100. The route information includes a request receiving robot schedule. The received operation plan is stored in the operation plan storage unit 226.

Figure 4:
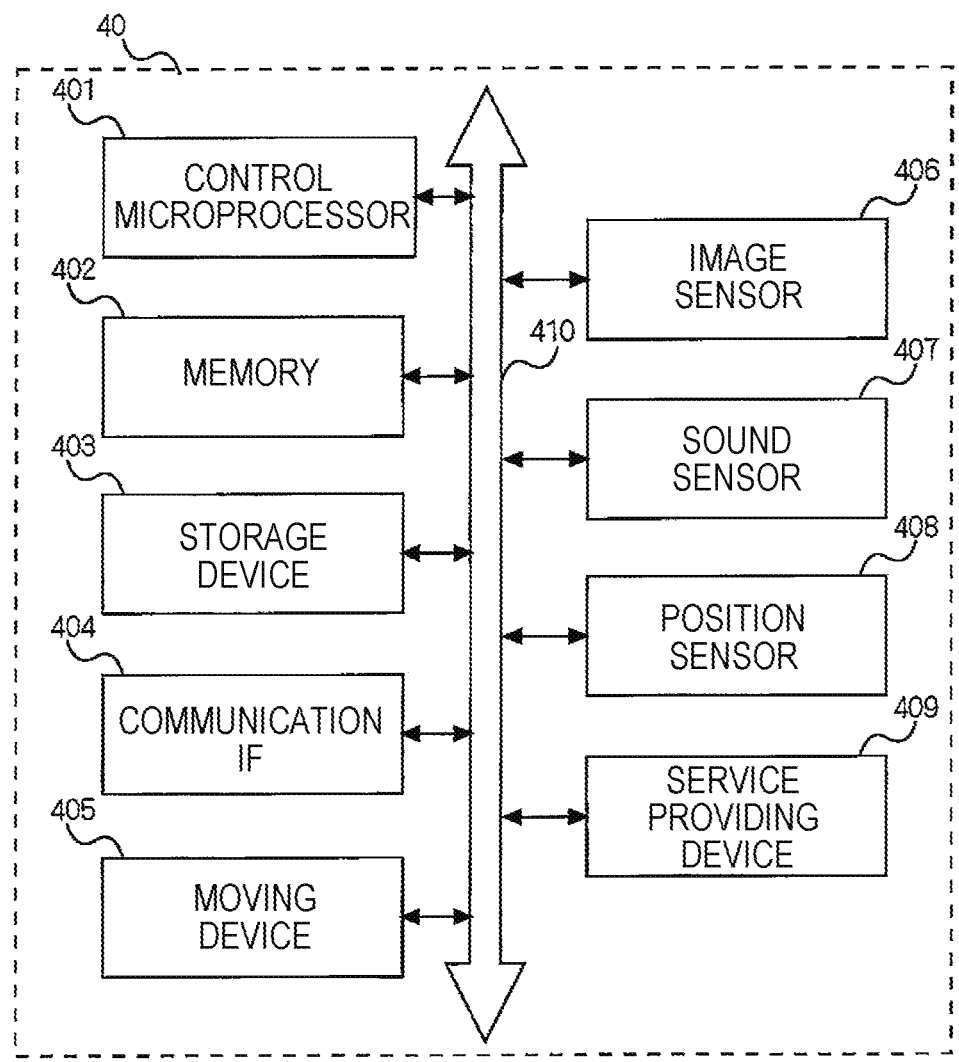
FIG. 4 is a hardware configuration diagram of a service providing robot according to the exemplary embodiment.

Next, the service providing robot 40 according to the exemplary embodiment will be described with reference to FIGS. 4 and 5. The service providing robot 40 is, for example, a self-propelled vending machine that provides a beverage to the user. Alternatively, the service providing robot 40 may be another machine that provides another service, for example, a carrying robot that carries articles. FIG. 4 is a hardware configuration diagram of the service providing robot 40. As illustrated in FIG. 4, the service providing robot 40 includes a control microprocessor 401, a memory 402, a storage device 403, a communication interface 404, a moving device 405, an image sensor 406, a sound sensor 407, a position sensor 408, and a service providing device 409. Each of the components is connected to a control bus 410.

The control microprocessor 401 generally controls the operations of the respective units of the service providing robot 40 based on a control program stored in the storage device 403. The memory 402 temporarily stores an image captured by the image sensor 406, sound data detected by the sound sensor 407, information on a current position detected by the position sensor 408, information on the service providing request from the user 60, information on the service providing request transmitted from the request receiving robot 20, and the like. The storage device 403 stores the control program for controlling the respective units of the service providing robot 40. The communication interface 404 performs a communication control for the service providing robot 40 to communicate with the request receiving robot 20 through the access point 70.

The moving device 405 includes tires, a motor, a direction control device, and a current position detecting device (each of which is not illustrated). The moving device 405 moves the service providing robot 40 based on machine body control information generated by the machine body control unit 220 which will be described later.

The image sensor 406 is configured with, for example, a camera. When the service providing robot 40 moves, the image sensor 406 captures the inside of the workplace 100, more specifically, walls and an obstacle in the workplace 100 and the user 60. The captured image is temporarily stored in the memory 402. The sound sensor 407 is a microphone. The sound sensor 407 detects voice uttered by the user 60. The sound sensor 407 temporarily stores the detected sound data in the memory 402. The position sensor 408 is configured with a GPS receiving device or the like. The position sensor 408 specifies the current position by receiving and analyzing signals from the GPS satellites. The specified position information is stored in the memory 402. Alternatively, the position sensor 408 may be configured with a receiving device that receives signals from beacon transmitters installed in respective locations of the workplace 100. The current position in the workplace 100 may be specified by analyzing the intensities of the received beacon signals. Moreover, the machine body control unit 220 which will be described later may specify the position by comparing the images of the walls and the obstacles in the workplace 100 which are captured by the image sensor 406 with a map of the workplace 100 which is stored in the storage device 403 in advance.

When the service providing robot 40 is a vending machine that provides a beverage, the service providing device 409 includes a beverage providing device configured with a beverage storing container, a beverage dispensing device, a container providing device, and a heating/cooling device (each of which is not illustrated). It should be noted that the service providing device 409 is not limited to the beverage providing device. The service providing device 409 may be another device for providing another service such as a device that carries or recovers articles, and a projector device.

Figure 5:
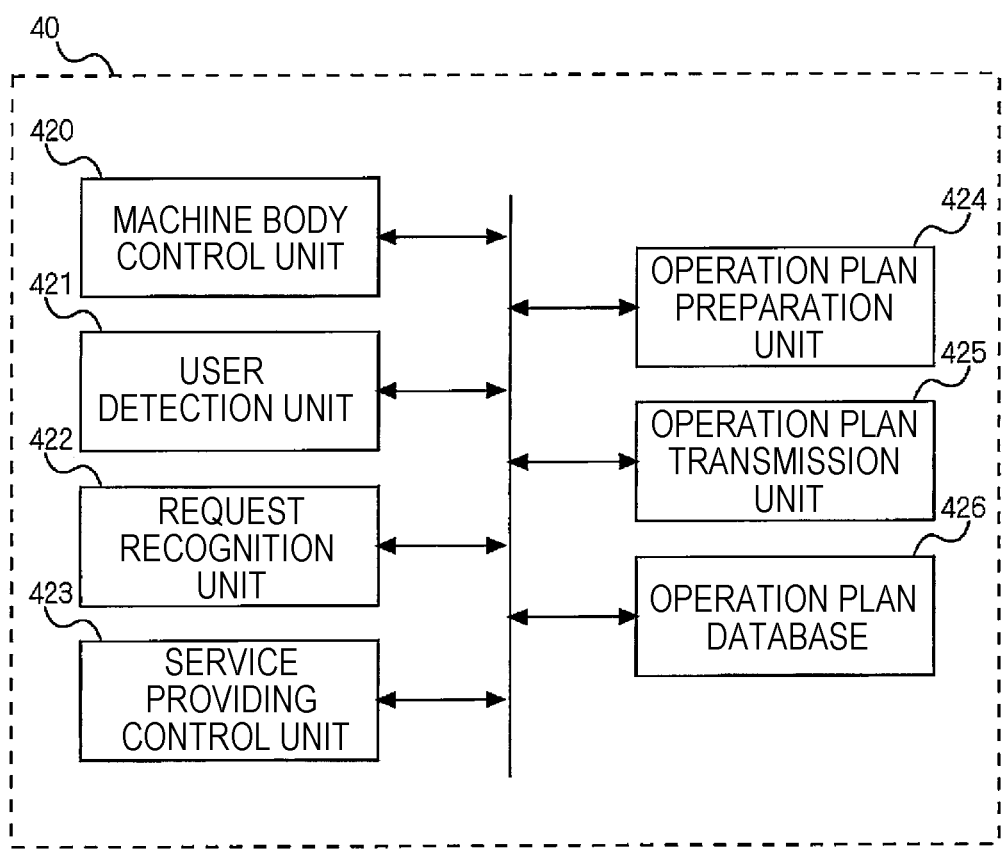
FIG. 5 is a functional block diagram of the service providing robot according to the exemplary embodiment.

FIG. 5 is a functional block diagram of a service providing robot 40. The service providing robot 40 serves as a machine body control unit 420, a user detection unit 421, a request recognition unit 422, a service providing control unit 423, an operation plan preparation unit 424, an operation plan transmission unit 425, and an operation plan database 426 as illustrated in FIG. 5 by executing the control programs stored in the storage device 403 in the control microprocessor 401.

The machine body control unit 420 controls the moving device 405 to cruise in the workplace 100 based on the service providing robot schedule which will be described later. Further, when the machine body control unit 420 receives a service providing request made by a specific user 60 from the request receiving robot 20, the machine body control unit 420 controls the moving device 405 to move the own device to the user 60 who has made the service providing request, as a destination according to the received service providing request.

The user detection unit 421 analyzes the image captured by the image sensor 406 to thereby specify the user 60 in the vicinity of the service providing robot 40 and determine the position of the user, and reflects the information on the user to a user arrangement table which will be described later.

The request recognition unit 422 determines whether the user 60 in the vicinity of the service providing robot 40 is making the service providing request by a gesture such as beckoning or by voice by analyzing the information detected by the image sensor 406 or the sound sensor 407. If it is determined that the service providing request is made, the request recognition unit 422 specifies the information on the user 60 and specifies the contents of the requested service. The request recognition unit 422 further receives a service providing request transmitted by the request receiving robot 20, and specifies a user 60 who makes a service request, a service which is requested by the user 60, and a place at which the service is requested by the user.

The service providing control unit 423 controls the service providing device 409 to provide the service to the user 60 who has made the service providing request. When the service providing device 409 is, for example, a beverage providing device, the service providing control unit 423 controls a heating/cooling device so as to maintain the beverage in the beverage storage container at a predetermined temperature. When the service providing device 409 moves to a specific user 60 who has made the service providing request, the service providing control unit 432 controls the service providing device 409 to discharge the container from the container providing device after stopping to move and to pour a predetermined beverage into the container from the beverage storage container, thereby providing the beverage to the user 60.

The operation plan preparation unit 424 prepares the operation plan including the request receiving robot schedule indicating a route along which the request receiving robot 20 should move, based on the user arrangement table and the service providing robot schedule. The operation plan is to operate the request receiving robot 20 with a priority being given to a point where a user having a high level of difficulty in contacting the service providing robot 40, that is, in directly making a service providing request exists. Alternatively, the operation plan is to operate the request receiving robot 20 with a priority being given to a point where a user who is highly likely to make a service providing request exists. A method of preparing the request receiving robot schedule will be described later.

The operation plan transmission unit 425 transmits the request receiving robot schedule prepared by the operation plan preparation unit 424 to the request receiving robot 20 through the access point 70.

The operation plan database 426 stores the user arrangement table, the service providing robot schedule, a service robot contact availability table, an area evaluation table, a service robot schedule evaluation table, and the request receiving robot schedule, which will be described below.

Figure 6:
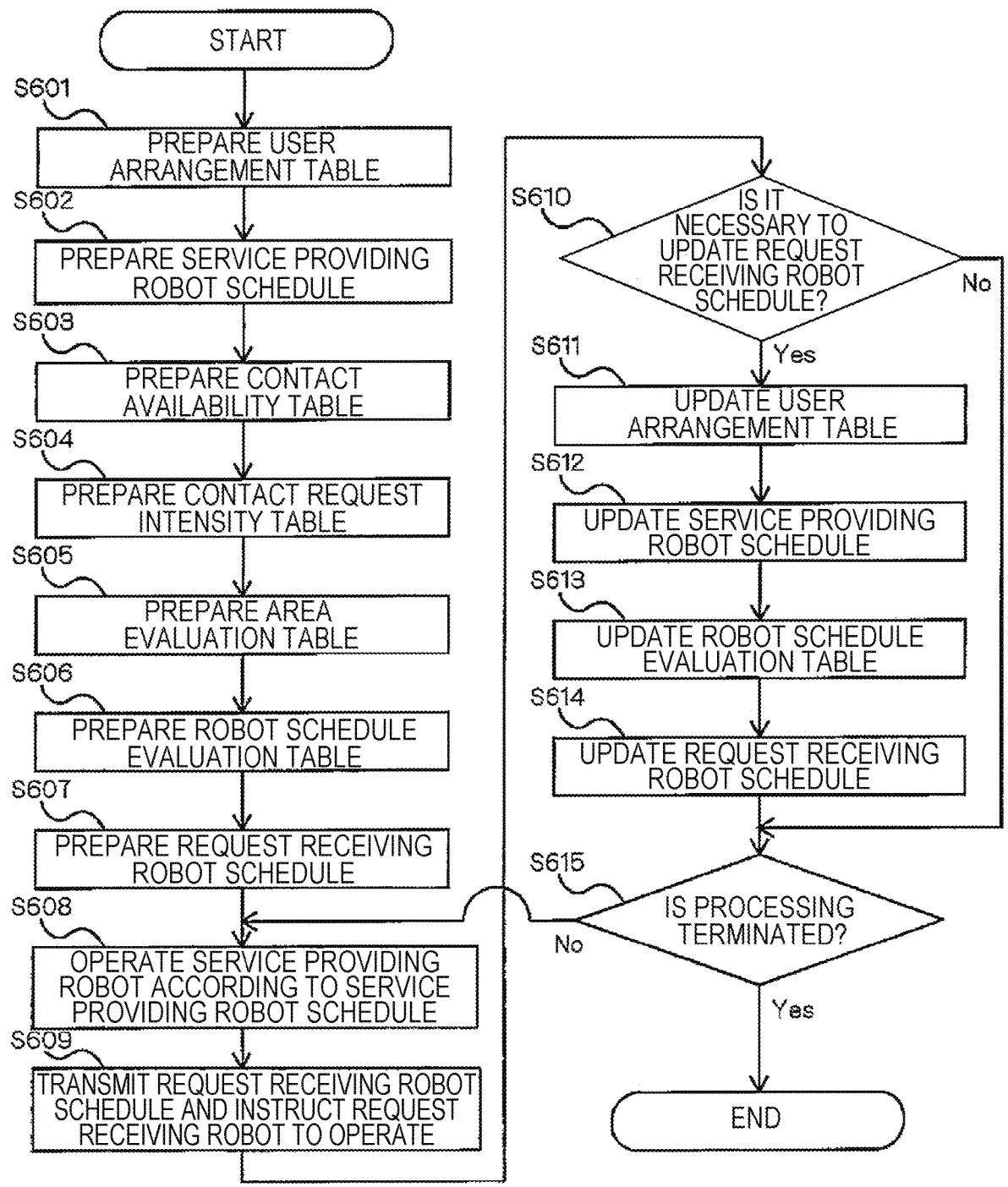
FIG. 6 is a flowchart illustrating one example of a flow of a process in the service providing robot in the exemplary embodiment.

Next, a flow of the operations of the service providing robot 40 and the request receiving robot 20 in the service providing system 10 according to the exemplary embodiment will be described with reference to FIGS. 6 to 11. FIG. 6 is a flowchart illustrating an example of a flow of a process in the service providing robot 40 in the exemplary embodiment. In step S601 of FIG. 6, the operation plan preparation unit 424 of the service providing robot 40 prepares the user arrangement table that represents an arrangement of users 60 in the workplace 100 and stores the prepared user arrangement table in the operation plan database 426. The user arrangement table is fixedly prepared in advance based on information acquired from a seating chart and the like. Alternatively, the user arrangement table may be prepared by determining a seating situation of users 60 in the workplace 100 in real time based on information received from a seating sensor attached to each seat in the workplace 100 and a motion sensor (not illustrated) installed at each location of the workplace 100.

Figure 7:
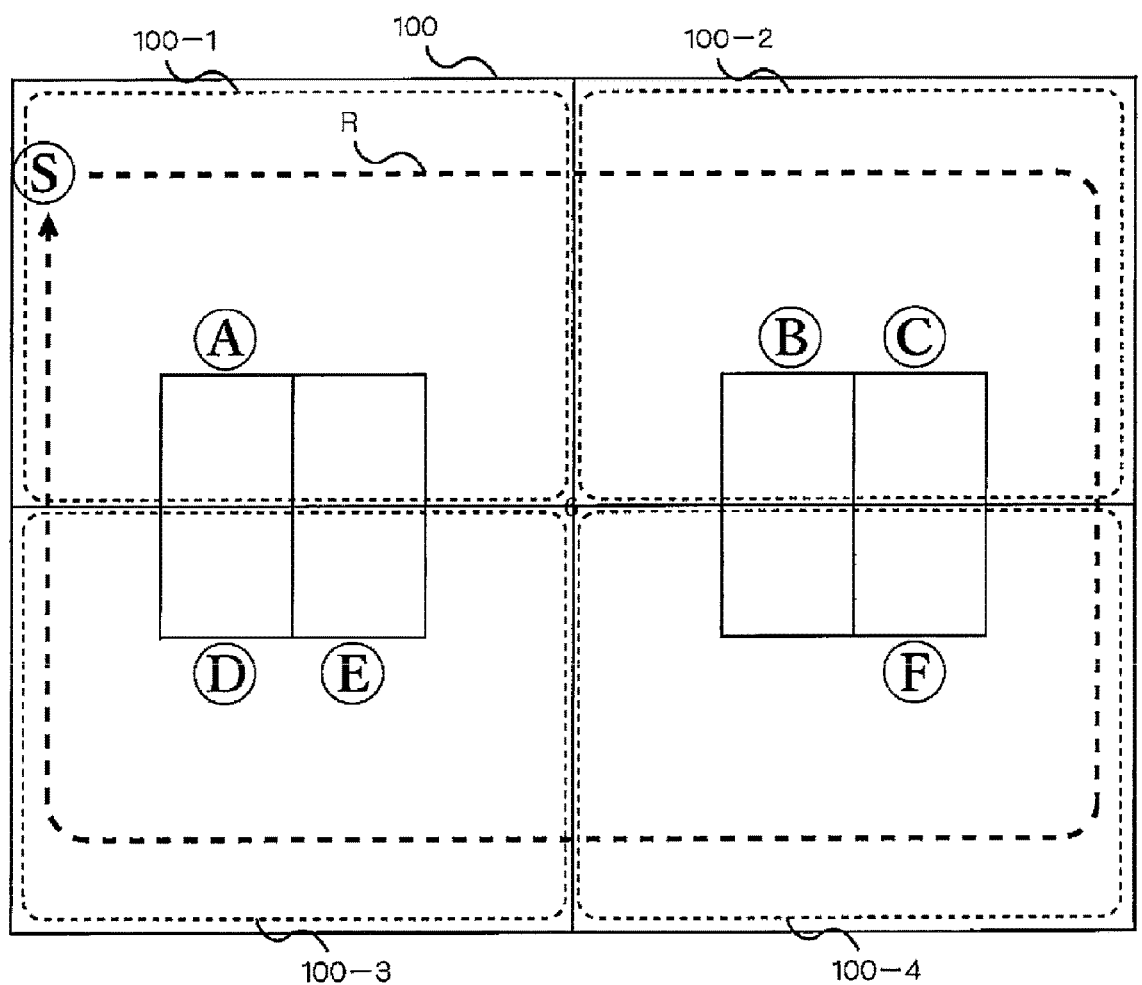
FIG. 7 is a diagram illustrating a manner in which users and areas in a workplace are divided and a movement schedule of the service providing robot.
Figure 8:
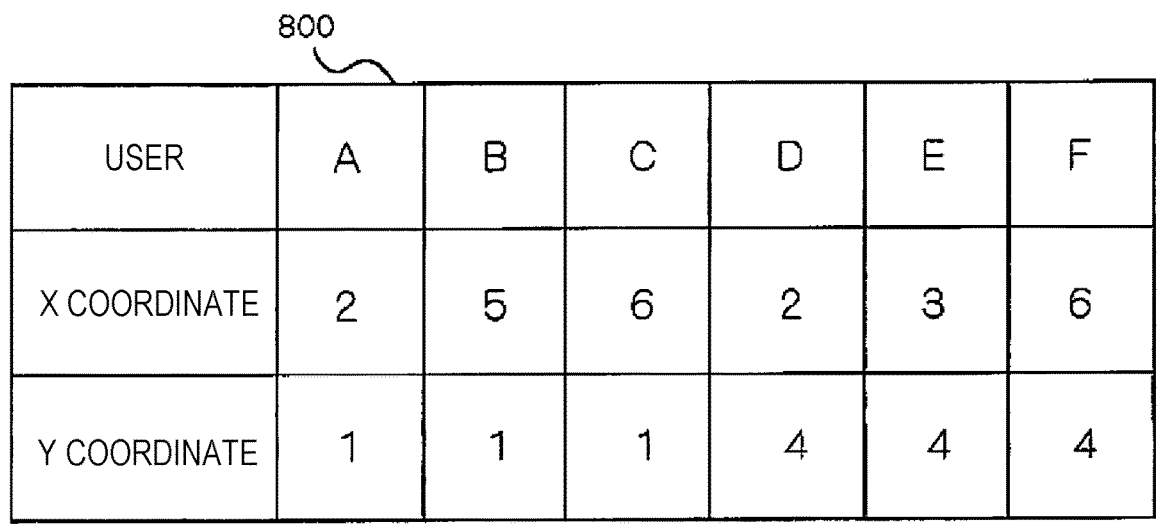
FIG. 8 is a diagram illustrating an example of a user arrangement table prepared by the service providing robot.

For example, as illustrated in FIG. 7, it is assumed that there are users A to F in the workplace 100 and the users A to F perform his/her tasks, respectively. The workplace 100 is divided into plural areas. For example, as illustrated in FIG. 7, the workplace 100 is divided into four areas 100-1 to 100-4, the user A belongs to the area 100-1, the users B and C belong to the area 100-2, the users D and E belong to the area 100-3, and the user F belongs to the area 100-4. In this case, the operation plan preparation unit 424 of the service providing robot 40 prepares a user arrangement table 800 illustrated in FIG. 8. The user arrangement table 800 represents the position coordinates of the users A to F.

Next, in step S602 of FIG. 6, the operation plan preparation unit 424 of the service providing robot 40 prepares the service providing robot schedule and stores the prepared service providing robot schedule in the operation plan database 426. The service providing robot schedule may be prepared in advance by an administrator who operates the service providing system 10. For example, it is assumed that in the workplace 100 illustrated in FIG. 7, the service providing robot 40 moves along a route R so that the service providing robot 40 departs from a point S, cruises clockwise around the workplace 100, and returns to the point S at 22 seconds after the start. In this case, the service providing robot schedule 900 represents a positional relationship between a time lapse and the service providing robot 40. An example of the service providing robot schedule 900 is illustrated in FIG. 9.

Next, in step S603 of FIG. 6, the operation plan preparation unit 424 of the service providing robot 40 prepares a contact availability table 1000 based on the user arrangement table 800 and the service providing robot schedule 900, and stores the prepared contact availability table 1000 in the operation plan database 426. The contact availability table 1000 indicates whether it is possible for each of the users A to F to contact the service providing robot 40 at respective time points. For example, the service providing robot 40 exists at a point (4, 0) after 4 seconds from departure at the point S. At that time, both the users B and C are capable of contacting the service providing robot 40. Thus, a mark "o" is given in the contact availability table. The "contact" described herein indicates that a user 60 has a positional relationship in which the user 60 is capable of directly requesting the service providing robot 40 to provide a service. Specifically, the "contact" means that the user 60 is at a distance where if the user 60 makes a service providing request by beckoning to the service providing robot 40 or by voice, the service providing robot 40 receives the request.

Next, in step S604 of FIG. 6, the operation plan preparation unit 424 of the service providing robot 40 prepares a contact request intensity table 1100 based on the contact availability table 1000 and stores the prepared contact request intensity table 1100 in the operation plan database 426. The contact request intensity table 1100 represents, by a numerical value, a level of a possibility that each of the users 60 will make a service providing request. For example, when each user 60 is capable of contacting the service providing robot 40, a contact request intensity is "0". The contact request intensity is set to increase according to an elapsed time from when the user became incapable of contacting the service providing robot 40. An example of the contact request intensity table 1100 is illustrated in FIG. 11. Alternatively, the contact request intensity table 1100 may represent, by a numerical value, a level of difficulty involved when each user 60 contacts the service providing robot 40. For example, in the contact request intensity table 1100, the level of difficulty may be represented by a numerical value based on a distance from the service providing robot 40 to each user 60.

In FIG. 11, for example, the user A was capable of contacting the service providing robot 40 until 2 seconds after the service providing robot 40 departed from the point S, but became incapable of contacting the service providing robot 40 after 3 seconds after the departure. Therefore, the contact request intensity increases by "1" every second, and the contact request intensity is indicated as "2" at 4 seconds after the service providing robot 40 departed from the point S. Further, the user B was incapable of contacting the service providing robot 40 until 2 seconds after the service providing robot 40 departed from the point S, but became capable of contacting the service providing robot 40 at 3 seconds from the departure. Therefore, the contact request intensity is indicated as "0" at 4 seconds after the departure.

Figure 12:
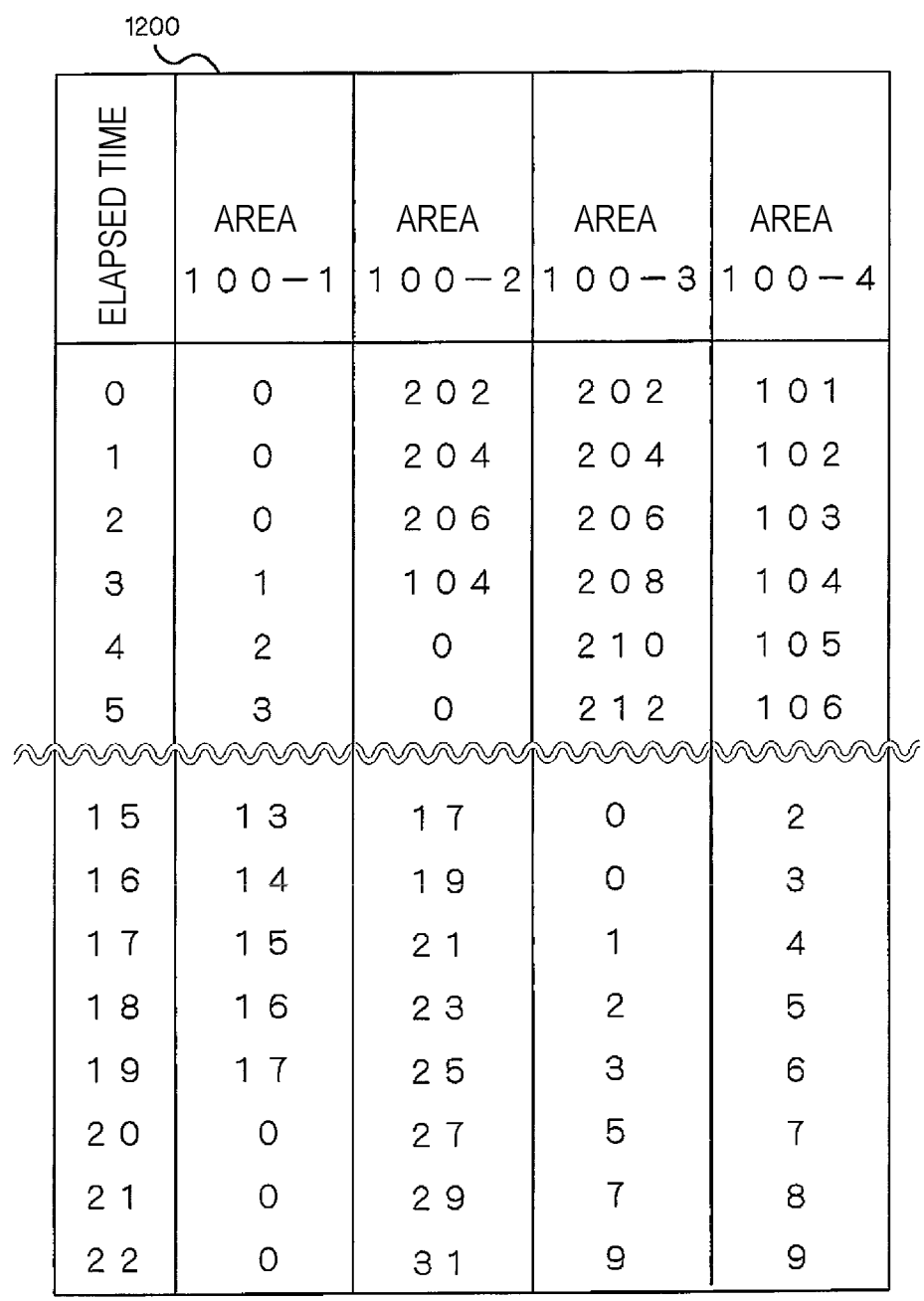
FIG. 12 is a diagram illustrating an example of an area evaluation table prepared by the service providing robot.

Next, in step S605 of FIG. 6, the operation plan preparation unit 424 of the service providing robot 40 prepares an area evaluation table 1200 based on the contact request intensity table 1100 and stores the prepared area evaluation table 1200 in the operation plan database 426. The area evaluation table 1200 represents values obtained by comprehensively processing contact request intensities of users who are present in each of the areas 100-1 to 100-4. Here, the contact request intensities of the users in the respective areas are summed up. An example of the area evaluation table 1200 is illustrated in FIG. 12. In FIG. 12, for example, an evaluation value of the area 100-1 at 4 seconds after the service providing robot 40 departs from the point S is calculated as "2", the evaluation value of the area 100-2 at that time is calculated as "0", the evaluation value of the area 100-3 at that time is calculated as "210", and the evaluation value of the area 100-4 at that time is calculated as "105". By comprehensively processing the contact request intensities for the respective areas, it is possible to comprehensively compare, from area to area, the levels of the difficulty involved when the users 60 in respective areas contact the service providing robot 40 or the levels of possibility that the users 60 in the respective areas will make the service providing request.

Next, in step S606 of FIG. 6, the operation plan preparation unit 424 of the service providing robot 40 prepares a robot schedule evaluation table 1300 based on the area evaluation table 1200 and stores the prepared robot schedule evaluation table 1300 in the operation plan database 426. FIG. 13 illustrates an example of the robot schedule evaluation table 1300. In the robot schedule evaluation table 1300, priorities are given based on the evaluation values of the areas of the area evaluation table. The robot schedule evaluation table 1300 shows that a place having a high priority is an area where the level of possibility that the service providing request will be made is the highest and that the place having high priority is an area where it is necessary to operate the request receiving robot 20 with priority. For example, the areas 100-2 and 100-3 have the priority of "1" until 2 seconds after the service providing robot 40 departs from the point S. However, the area 100-3 has the priority of "1" and the areas 100-2 and 100-4 have a priority of "2" at 3 seconds after the departure, and only the area 100-3 has the priority of "1" at 4 seconds after the departure. Further, it can be seen that from 15 seconds to 22 seconds, the area 100-2 has the priority of "1" and the request receiving robot 20 should be located in the area 100-2.

Next, in step S607 of FIG. 6, the request receiving robot schedule is prepared based on the robot schedule evaluation table 1300 and stored in the operation plan database 426. The request receiving robot schedule represents areas to which the request receiving robot 20 should be preferentially sent, in a time series manner. The request receiving robot schedule indicates a route along which the request receiving robot 20 should move in the workplace 100.

Next, in step S608, the machine body control unit 420 of the service providing robot 40 controls the service providing robot 40 to move along the service providing robot schedule 900 (or the route R) stored in the operation plan database 426.

In step S609, the operation plan transmission unit 425 transmits the operation plan including the request receiving robot schedule stored in the operation plan database 426 to the request receiving robot 20 and instructs the request receiving robot 20 to float and move in the workplace 100 in accordance with the request receiving robot schedule. According to the operation plan, the request receiving robot 20 is operated with a priority being given to an area where a user having a long elapsed time from when the service providing robot 40 was capable of contacting the user is present.

In step S610, the operation plan preparation unit 424 of the service providing robot 40 determines whether or not it is necessary to update the request receiving robot schedule. Specifically, if a service providing request is made directly from a user 60 or through the request receiving robot 20, if the position of a user 60 within the workplace 100 is changed, or if the service providing robot 40 does not operate along the planned route due to an obstacle present in the workplace 100, it is determined that it is necessary to update the request receiving robot schedule.

In step S610, if it is determined that it is necessary to update the request receiving robot schedule, the process proceeds to step S611. If it is determined that it is not necessary to update the request receiving robot schedule, the process proceeds to step S615.

In step S611, if the position of the user 60 is changed, the operation plan preparation unit 424 updates the user arrangement table 800 so that the latest position of the user 60 is reflected to the user arrangement table 800. Further, if the position of the user 60 is not changed, the process proceeds to step S612 without updating the user arrangement table 800.

In step S612, the service providing robot schedule 900 is updated, that is, a new route along which the service providing robot 40 moves is set according to the user arrangement table 800 updated in step S611. Even if it is not necessary to update the user arrangement table 800, the service providing robot schedule 900 is also updated and the new route through which the service providing robot 40 moves is also set in any of the following cases: a case where the service providing robot 40 starts to move toward the user 60 who has made the service providing request while changing the route because the service providing request has been received from the user 60 through the request receiving robot 20; a case where the service providing robot 40 has received the service providing request directly from the user 60; or a case where the service providing robot 40 is not capable of operating along the planned route.

In step S613, the operation plan preparation unit 424 of the service providing robot 40 updates the robot schedule evaluation table 1300 based on the updated user arrangement table 800 and service providing robot schedule 900. Since the updating in step 613 is performed in the same manner as preparing the robot schedule evaluation table in steps S603 to S606, description thereof will be omitted.

Next, in step S614, the operation plan preparation unit 424 of the service providing robot 40 updates the request receiving robot schedule based on the updated robot schedule evaluation table 1300. That is, the operation plan preparation unit 424 determines the new route along which the request receiving robot 20 should move in the workplace 100.

In step S615, the machine body control unit 420 determines whether to terminate the operation process of the service providing robot 40. For example, if the service providing robot 40 finishes the movement to a destination along the predetermined robot schedule, it may be determined to terminate the process. If it is determined to terminate the process, the machine body control unit 420 stops the operation of the service providing robot 40 and the operation plan transmission unit 425 transmits an instruction to terminate request reception to the request receiving robot 20 and terminates the process.

If it is determined not to terminate the movement control process of the service providing robot 40, the process returns to step S608 to continue the operations of the service providing robot 40 and the request receiving robot 20. Further, if the service providing robot schedule 900 and the request receiving robot schedule are updated in steps S611 to S614 at the operation process termination determination process in step S615, it is determined that the movement control process of the service providing robot 40 is not terminated, and the process proceeds to the processes in steps S608 and S609. Then, the machine body control unit 420 causes the service providing robot 40 to operate based on the updated service providing robot schedule 900 and the operation plan transmission unit 425 transmits the updated request receiving robot schedule to the request receiving robot 20.

Figure 14:
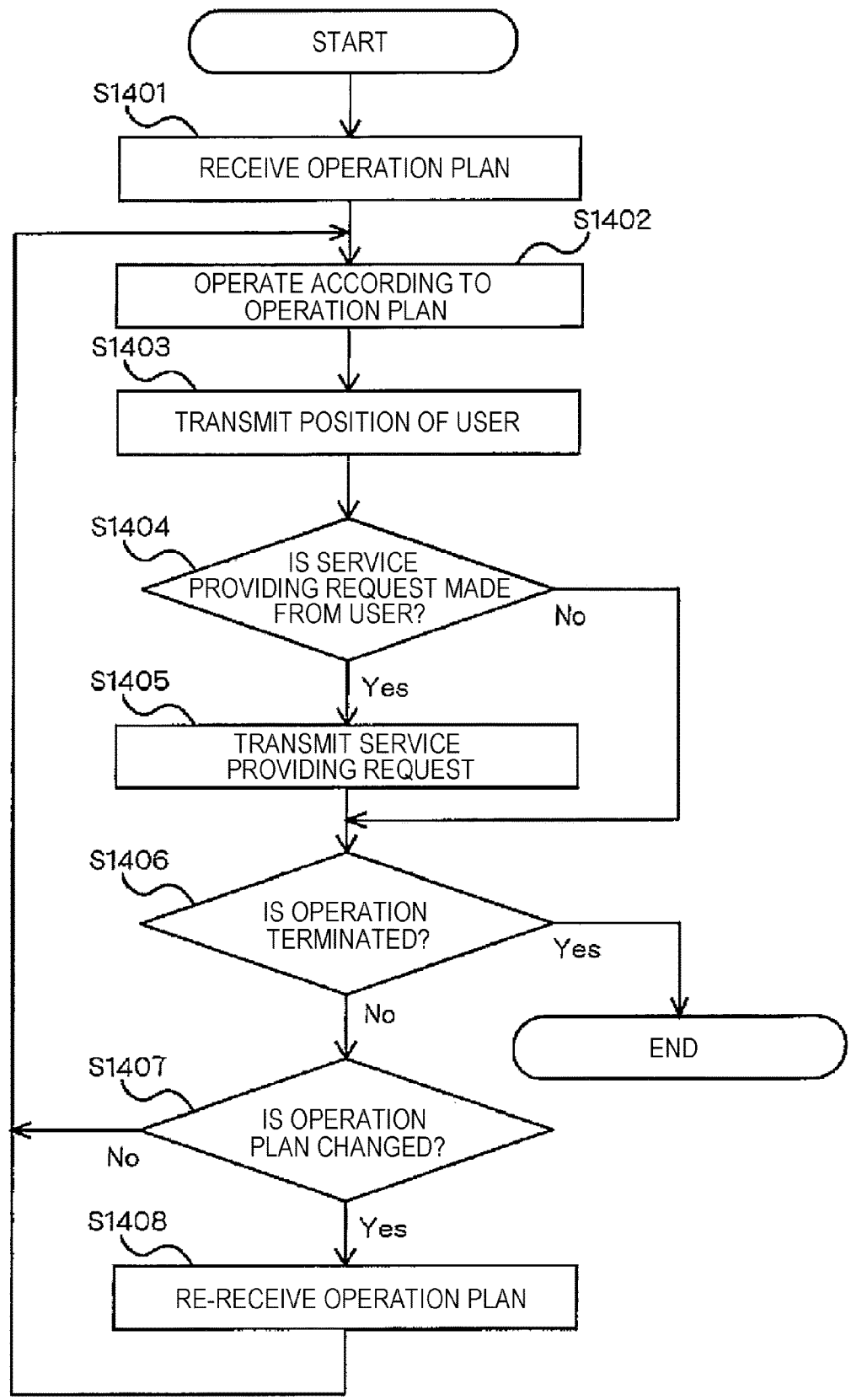
FIG. 14 is a flowchart illustrating a flow of a machine body control process in the request receiving robot.

Next, a flow of a machine body control process in the request receiving robot 20 will be described with reference to FIG. 14. FIG. 14 is a flowchart illustrating a flow of the machine body control process in the request receiving robot 20. In step S1401, the operation plan receiving unit 225 of the request receiving robot 20 receives the operation plan including the request receiving robot schedule transmitted from the service providing robot 40 and stores the received operation plan in the operation plan storage unit 226. Next, in step S1402, the machine body control unit 220 of the request receiving robot 20 controls the propulsion device 206 and the direction control device 207 according to the request receiving robot schedule included in the operation plan stored in the operation plan storage unit 226 so that the request receiving robot 20 floats and moves along the route included in the operation plan.

In step S1403, while the request receiving robot 20 is floating and moving in the workplace 100 according to the operation plan, the request receiving robot 20 specifies a user 60 and the position of the user 60 in the workplace 100 by the image sensor 208 and the position sensor 210, and the user position transmission unit 224 transmits information on the specified user 60 and the position of the specified user 60 to the service providing robot 40.

In step S1404, the request recognition unit 221 of the request receiving robot 20 determines whether or not a service providing request is made from a user 60 existing in the vicinity of the own device by analyzing the information acquired by the image sensor 208 and the sound sensor 209. If it is determined that the service providing request is made from the user 60 existing in the vicinity of the own device, the process proceeds to step S1405. The request recognition unit 221 specifies who the user 60 is and also specifies the current position of the user 60 and the contents of the request, the request transmission unit 222 transmits the service providing request information including that information to the service providing robot 40, and the process proceeds to step S1406. In step S1404, if the request recognition unit 221 determines that no service providing request is made from the user 60, the process proceeds to step S1406.

In step S1406, the machine body control unit 220 determines whether to terminate the operation of the request receiving robot 20. If it is determined to terminate the operation, the machine body control unit 220 terminates the operation of the request receiving robot 20. If it is determined not to terminate the operation, the process proceeds to step S1407.

In step S1407, the machine body control unit 220 determines whether or not the operation plan is changed. Specifically, the determination is made based on whether or not the operation plan receiving unit 225 receives a notification of the change of the operation plan from the service providing robot 40. If the operation plan is changed, the process proceeds to step S1408, the operation plan receiving unit 225 receives again the updated operation plan from the service providing robot 40, and the process returns to step S1402. In step S1407, if the operation plan receiving unit 225 determines that the operation plan is not changed, the process returns to step S1402. Then, the machine body control unit 220 controls the propulsion device 206 and the direction control device 207 of the request receiving robot 20 according to the operation plan stored in the operation plan storage unit 226 so that the request receiving robot 20 continuously moves in the workplace 100.

Figure 15:
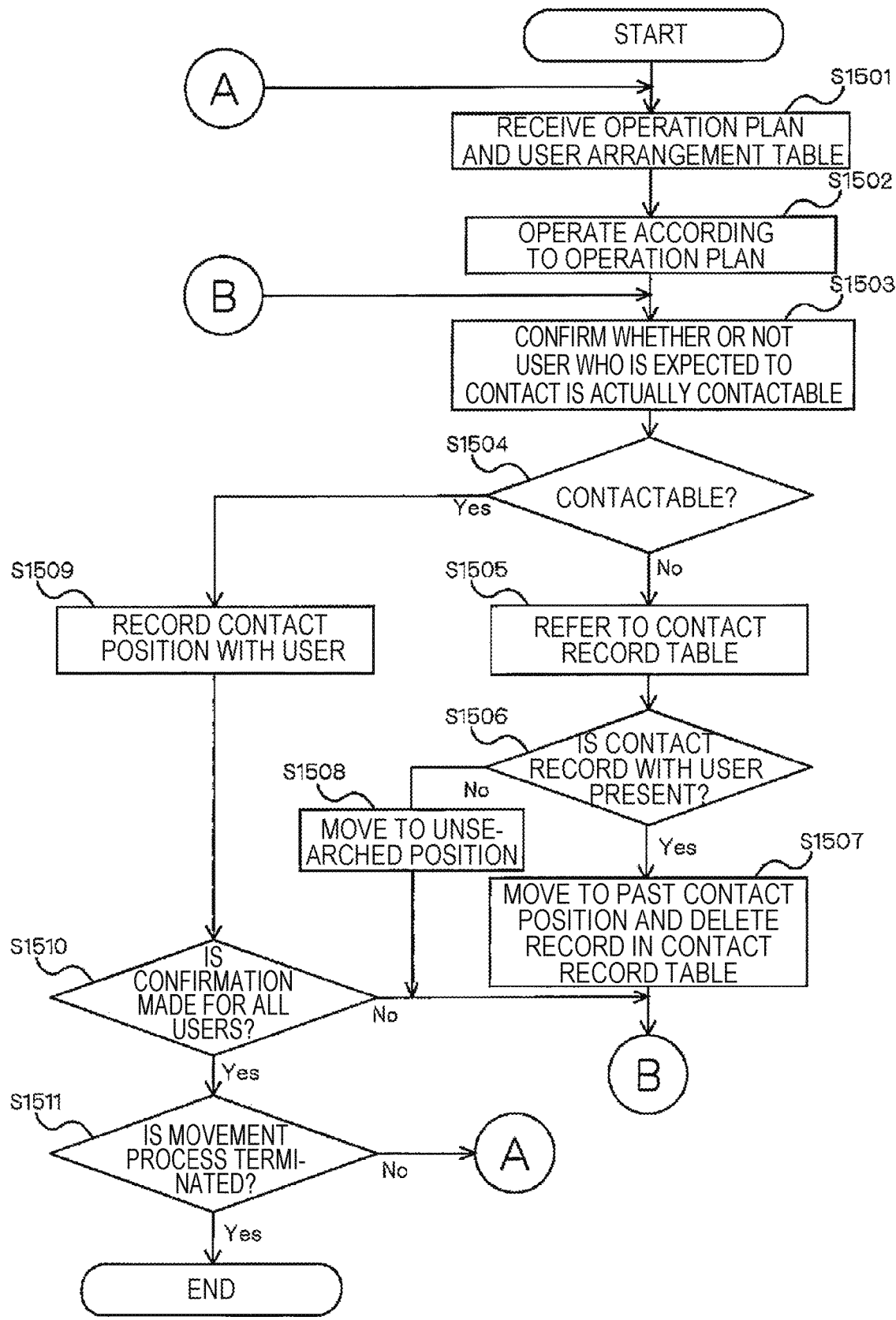
FIG. 15 is a flowchart illustrating a control process in the request receiving robot when it is possibly difficult to contact a user from the viewpoint of the request receiving robot.

In the above described control method of the request receiving robot 20, even if the user 60 is at a predetermined position, there is a possibility that the request receiving robot 20 is not able to recognize the service providing request from the user 60 when the user 60 is bowing his/her head, when there is an obstacle, or when the user 60 is located at a blind spot when viewed from the request receiving robot 20. A control method for reliably recognizing the service providing request from the user 60 even in such a case will be described with reference to FIG. 15. FIG. 15 is a flowchart illustrating a control process in the request receiving robot 20 when it is possibly difficult to contact a user 60 from the viewpoint of the request receiving robot 20.

First, as the process at the service providing robot 40 side, in step S609 of FIG. 6, the service providing robot 40 transmits the request receiving robot schedule to the request receiving robot 20 as an operation plan and transmits the user arrangement table 800 stored in the operation plan database 426 to the request receiving robot 20. In the following, the description will be given on the process performed at the request receiving robot 20 side. In step S1501 of FIG. 15, the operation plan receiving unit 225 of the request receiving robot 20 receives the operation plan including the request receiving robot schedule and the user arrangement table 800 and stores the received operation plan in the operation plan storage unit 226. Further, the operation plan storage unit 226 of the request receiving robot 20 stores a contact record table for each user 60. The contact record table stores a position of the request receiving robot 20 where the request receiving robot 20 actually contacted a user 60 in the past.

In step S1502, the machine body control unit 220 of the request receiving robot 20 controls the propulsion device 206 and the direction control device 207 based on the request receiving robot schedule included in the operation plan stored in the operation plan storage unit 226 so that the request receiving robot 20 floats and moves in the workplace 100 along the route included in the operation plan.

In step S1503, the user recognition unit 223 of the request receiving robot 20 specifies a contactable user 60 at the current position by comparing the current position detected by the position sensor 210 with the user arrangement table 800 stored in the operation plan storage unit 226. Further, the image sensor 208 captures surroundings of the request receiving robot 20. The user recognition unit 223 analyzes the captured image.

In step S1504, the user recognition unit 223 of the request receiving robot 20 determines whether or not the request receiving robot 20 is capable of actually contacting the user 60 specified by the user arrangement table 800 at the current position. If it is determined that the request receiving robot 20 is not capable of actually contacting the user 60, the process proceeds to step S1505. If it is determined that the request receiving robot 20 is capable of actually contacting the user 60, the process proceeds to step S1509.

In step S1505, the user recognition unit 223 refers to the contact record table stored in the operation plan storage unit 226 and searches the contact record table for a record in which an actual contact record of the request receiving robot 20 with the users 60 is recorded as position information. In step S1506, if the user recognition unit 223 determines that there is a contact record with the user 60 in the contact record table, the process proceeds to step S1507.

In step S1507, the machine body control unit 220 of the request receiving robot 20 moves the request receiving robot 20 to the position, recorded in the contact recording table, at which the request receiving robot 20 contacted with the user 60 in the past and at the same time. At the same time, the machine body control unit 220 of the request receiving robot 20 deletes the record, recorded in the contact record table, regarding the position at which the request receiving robot 20 contacts with the user 60. Then, the process returns to step S1503, and the process of determining whether or not the request receiving robot 20 is capable of actually contacting the user 60 is executed again.

In step S1506, if it is determined that there is no contact record with the user 60 in the contact record table, the process proceeds to step S1508. In step S1508, the machine body control unit 220 moves the request receiving robot 20 to another position which has not been searched. Then, the process returns to step S1503 and the process of determining whether or not the request receiving robot 20 is capable of actually contacting the user 60 at the new position is executed again.

In step S1504, if the user recognition unit 223 of the request receiving robot 20 determines that the request receiving robot 20 is capable of actually contacting the user 60 specified by the user arrangement table 800 at the current position, the process proceeds to step S1509. Then, the position where the request receiving robot 20 was capable of contacting the user 60 in the contact record table is stored in the operation plan storage unit 226. The process proceeds to step S1510.

In step S1510, the user recognition unit 223 determines whether or not all users 60 in the workplace 100 stored in the operation plan storage unit 226 actually contacted the request receiving robot 20. If it is determined that there is a user 60 who has not yet contacted the request receiving robot 20, the process returns to step S1503. If it is determined that contact confirmation has been performed for all the users 60, the process proceeds to step S1511.

In step S1511, the machine body control unit 220 determines whether or not the movement process based on the request receiving robot schedule stored in the operation plan storage unit 226 is terminated. When the movement process is not terminated, the process returns to step S1501. When the movement process is terminated, the machine body control unit 220 moves the request receiving robot 20 to a predetermined position and terminates the movement control.

In the above description, as illustrated in FIG. 7, descriptions have been made on the case where the workplace 100 is divided into the areas 100-1 to 100-4 having the same size and the request receiving robot 20 is moved according to the contact request intensities of the respective areas. However, if partitions, racks, and the like are present in the workplace 100, there may a case in which the partitions, the racks and the like become the obstacles and the request receiving robot 20 is not capable of contacting users 60 existing in the respective areas. In the following example, the area division is adjusted again in consideration of the obstacles such that the request receiving robot 20 is capable of contacting all of the users 60 existing in each area.

Figure 16:
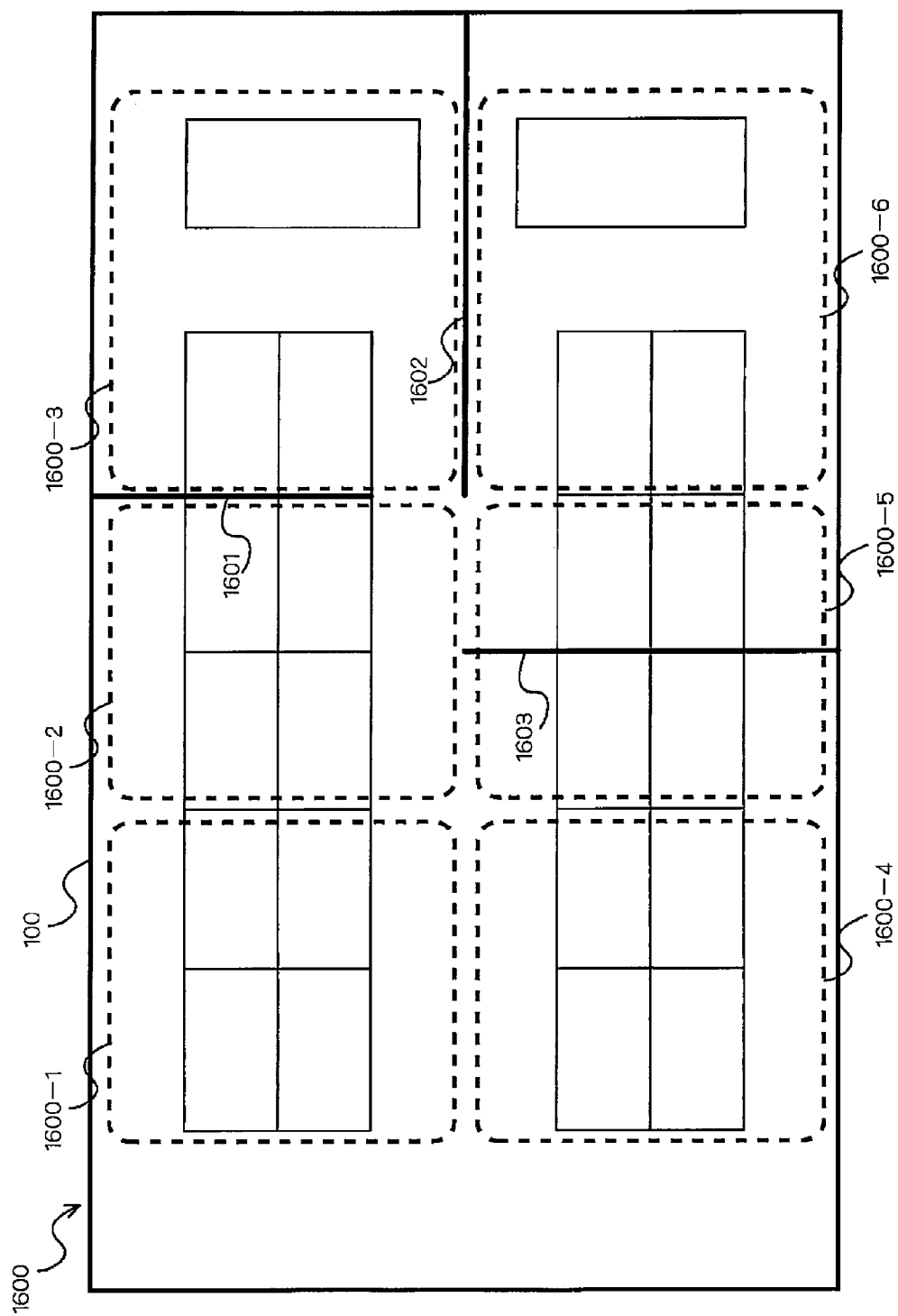
FIG. 16 is a 3D map illustrating obstacles in the workplace.

FIG. 16 is a 3D map 1600 illustrating obstacles in a workplace 100. In the 3D map 1600, the presence of obstacles 1601 to 1603 having a certain height from the floor surface in the workplace 100 is registered. Examples of the obstacles include a partition and a rack. The 3D map 1600 may be artificially prepared and stored together with the user arrangement table 800 in the operation plan database 426 of the service providing robot 40. Alternatively, the 3D map 1600 may be generated based on information which the request receiving robot 20 and the service providing robot 40 have acquired while cruising in the workplace 100.

Figure 17:
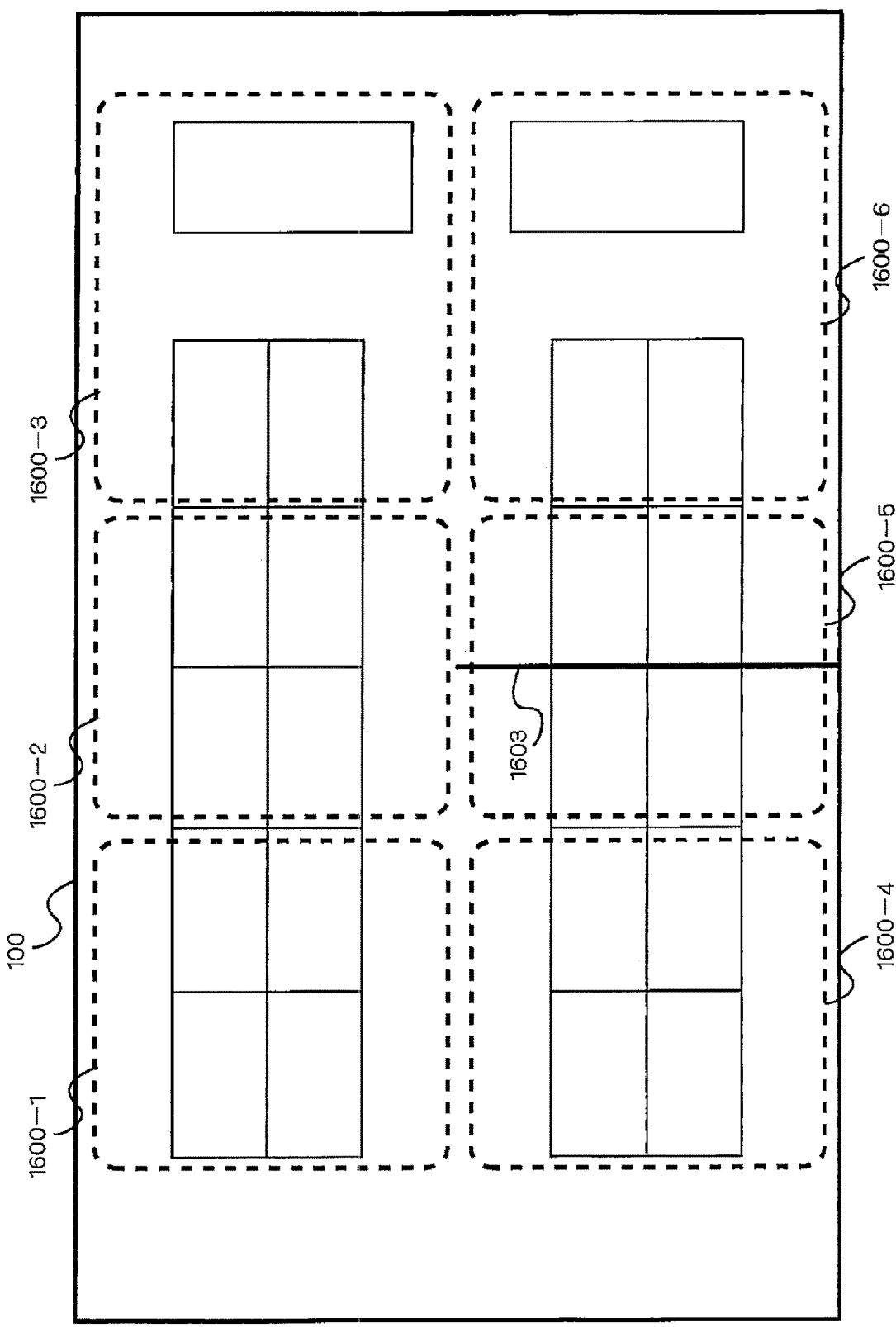
FIG. 17 is a 3D map in which the obstacles which divide areas in FIG. 16 are extracted.

Next, the operation plan preparation unit 424 of the service providing robot 40 extracts obstacles that divide the respective areas among the obstacles 1601 to 1603 in the 3D map 1600. For example, it is assumed that the workplace 100 in FIG. 16 is divided into areas 1600-1 to 1600-6. In FIG. 16, the obstacle 1601 is located at a boundary between the area 1600-2 and the area 1600-3. Similarly, the obstacle 1602 is located at a boundary between the area 1600-3 and the area 1600-6. Therefore, the obstacles 1601 and 1602 are not regarded as the obstacles that divide the areas. On the other hand, the obstacle 1603 exists inside the area 1600-5 and divides this area 1600-5. Therefore, the obstacle 1603 is extracted as an obstacle dividing an area as illustrated in FIG. 17. It should be noted that FIG. 17 is a 3D map obtained by superimposing the obstacle which divides the area and which is extracted from the 3D map 1600 of FIG. 16, onto a map illustrating initial area division.

Figure 18:
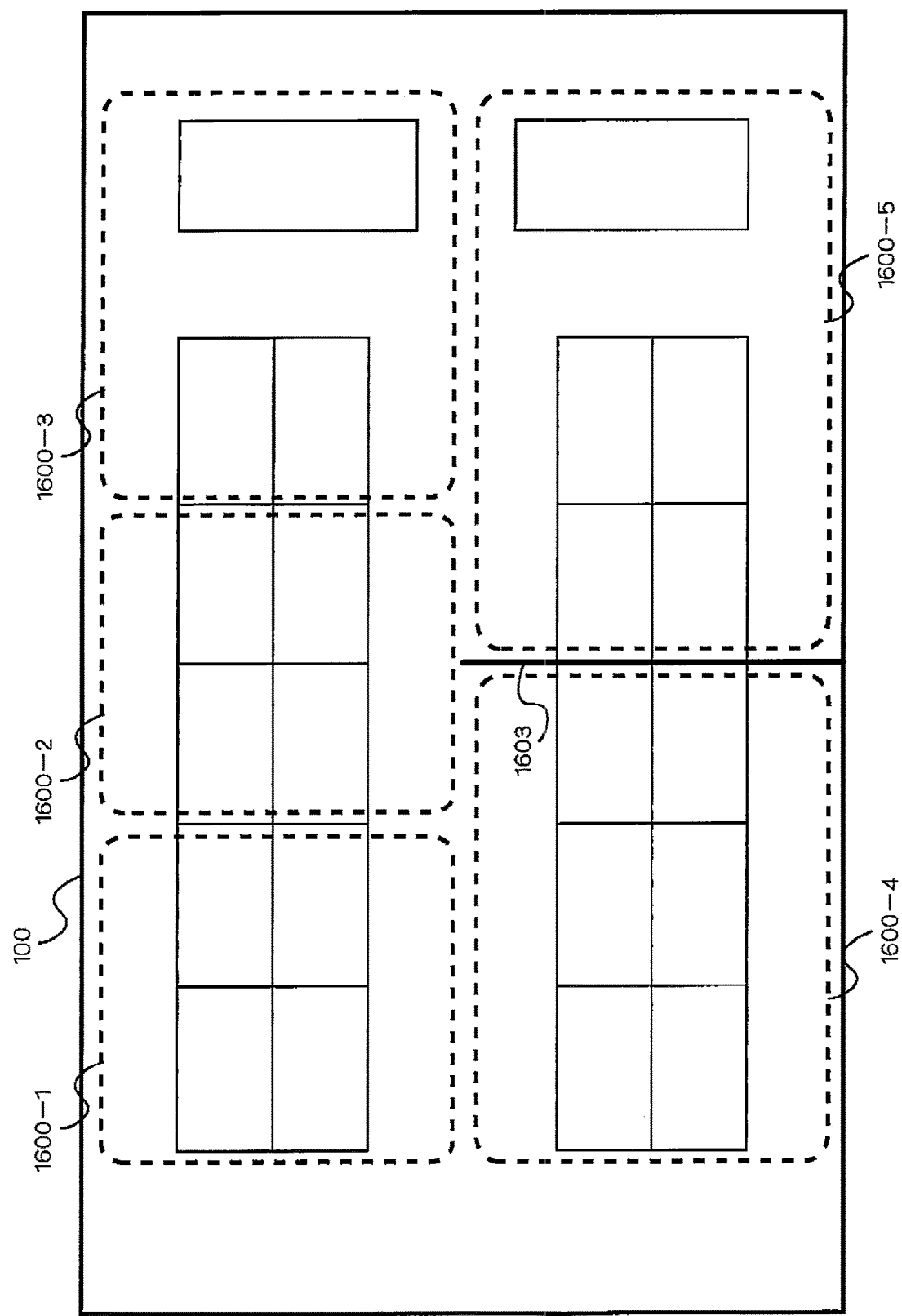
FIG. 18 is a 3D map in which the workplace in FIG. 16 is re-divided according to the obstacles.

The operation plan preparation unit 424 merges the areas divided by the obstacle with adjacent areas and stores the merged areas as new areas. For example, in FIG. 17, the left part of the area 1600-5 divided by the obstacle 1603 is merged with the area 1600-4 and the right part of the area 1600-5 is merged with the area 1600-6, thereby forming a new area 1600-5. As a result, the workplace is re-divided into five areas 1600-1 to 1600-5 as illustrated in FIG. 18. If an area formed by merging the areas has a size that is larger than twice a size that is recognizable by the request receiving robot 20 at one time, such an area may be further re-divided.

Next, the operation plan preparation unit 424 prepares the area evaluation table 1200 stored in the operation plan database 426 according to the newly subdivided area, prepares the service robot schedule evaluation table 1300 and the request receiving robot schedule according to this area evaluation table 1200, and transmits the updated request receiving robot schedule to the request receiving robot 20. The request receiving robot 20 floats and moves within the workplace 100 according to the updated request receiving robot schedule so as to contact all of the users 60 existing in the workplace 100. If the service providing request is made from a user 60, the request receiving robot 20 follows the request.

In the workplace 100, if the request receiving robot 20 operates or stops in the vicinity of an air outlet of an air conditioning device such as an air conditioner or in the vicinity of a lighting device, the functions of the air conditioning device or the lighting device maybe interfered. Therefore, the positions where the air outlet of the air conditioning device and the lighting device are installed are registered in the 3D map of the operation plan database 426 of the service providing robot 40. These positions are set as exclusion areas where the request receiving robot 20 does not stop or operate. If the request receiving robot 20 approaches these positions, the request receiving robot 20 may be controlled to avoid these exclusion areas and to operate or stop at other neighboring places.

Alternatively, an area in which the request receiving robot 20 is capable of operating may be registered in the 3D map of the operation plan database 426. The request receiving robot 20 maybe controlled to operate only in the area in which the request receiving robot is capable of operating.

In the exemplary embodiment, an example in which the request receiving robot 20 includes the air sac 205, the propulsion device 206, and the direction control device 207 has been described. However, the present disclosure is not limited to the exemplary embodiment. The request receiving robot 20 may be a light flying device called "drone" that is equipped with a wing, a propeller, and a direction control device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A service providing system comprising:
   a request receiving robot including
      a floating unit configured to float in air,
      a recognition unit configured to recognize a service providing request by a user, and
      a transmitter configured to transmit the recognized service providing request; and
   a service providing robot including
      a receiver configured to receive the service providing request transmitted by the request receiving robot,
      a moving unit configured to move the service providing robot to the user who makes the service providing request as a destination according to the received service providing request, and
      a service providing unit configured to provide a service to the user, wherein
   the floating unit of the request receiving robot includes a propulsion unit and a direction control unit,
   the request receiving robot includes a controller configured to control the propulsion unit and the direction control unit according to an operation plan corresponding to a position of the user, and
   the operation plan is prepared to operate the request receiving robot with a priority being given to a point where the user having a high level of difficulty in directly requesting the service providing robot to provide the service exists.

2. The service providing system according to claim 1, wherein the operation plan is prepared to operate the request receiving robot with the priority being given to a point where the user having a long elapsed time from when the user was capable of directly requesting the service providing robot to provide the service exists, based on an operation schedule of the service providing robot.

3. The service providing system according to claim 1, wherein the operation plan is prepared to divide a place where the request receiving robot and the service providing robot operate into a plurality of areas and to operate the request receiving robot with the priority being given to an area where a level of difficulty involved when the user therein directly requests the service providing robot to provide the service is comprehensively high.

4. The service providing system according to claim 3, wherein the operation plan is prepared to divide the place where the request receiving robot and the service providing robot operate into the plurality of areas, to comprehensively process, for each area, elapsed times from when users in each area were capable of directly requesting the service providing robot to provide the service, and to operate the request receiving robot with the priority being given to an area having a long elapsed time in total.

5. The service providing system according to claim 1, wherein the operation plan is prepared to divide a place where the request receiving robot and the service providing robot operate into a plurality of areas and to operate the request receiving robot with the priority being given to an area where a possibility that the user therein will make the service providing request is comprehensively high.

6. The service providing system according to claim 1, wherein the operation plan defines an exclusion area where the request receiving robot does not operate.

7. The service providing system according to claim 1, wherein the operation plan defines an area where the request receiving robot is capable of operating.

8. A service providing system comprising:
a request receiving robot including
a floating unit configured to float in air,
a recognition unit configured to recognize a service providing request by a user, and
a transmitter configured to transmit the recognized service providing request; and
a service providing robot including
a receiver configured to receive the service providing request transmitted by the request receiving robot,
a moving unit configured to move the service providing robot to the user who makes the service providing request as a destination according to the received service providing request, and
a service providing unit configured to provide a service to the user, wherein
the floating unit of the request receiving robot includes a propulsion unit and a direction control unit,
the request receiving robot includes a controller configured to control the propulsion unit and the direction control unit according to an operation plan corresponding to a position of the user,
the operation plan is prepared to operate the request receiving robot with a priority being given to a point where the user who is highly likely to make the service providing request exists, and
the operation plan is prepared to operate the request receiving robot with the priority being given to a point where the user having a long elapsed time from when the user was capable of directly requesting the service providing robot to provide the service exists, based on an operation schedule of the service providing robot.

9. A service providing system comprising:
a request receiving robot including
a floating unit configured to float in air,
a recognition unit configured to recognize a service providing request by a user, and
a transmitter configured to transmit the recognized service providing request; and
a service providing robot including
a receiver configured to receive the service providing request transmitted by the request receiving robot,
a moving unit configured to move the service providing robot to the user who makes the service providing request as a destination according to the received service providing request, and
a service providing unit configured to provide a service to the user, wherein
the floating unit of the request receiving robot includes a propulsion unit and a direction control unit,
the request receiving robot includes a controller configured to control the propulsion unit and the direction control unit according to an operation plan corresponding to a position of the user,
the operation plan is prepared to operate the request receiving robot with a priority being given to a point where the user who is highly likely to make the service providing request exists,
the operation plan is prepared to divide a place where the request receiving robot and the service providing robot operate into a plurality of areas and to operate the request receiving robot with a priority being given to an area where a possibility that the user therein will make the service providing request is comprehensively high, and
the operation plan is prepared to divide the place where the request receiving robot and the service providing robot operate into the plurality of areas, to comprehensively process, for each area, elapsed times from when users in each area were capable of directly requesting the service providing robot to provide the service, and to operate the request receiving robot with the priority being given to an area having a long elapsed time in total.

* * * * *